(12) United States Patent
Hernandez et al.

(10) Patent No.: US 9,000,721 B2
(45) Date of Patent: Apr. 7, 2015

(54) SYSTEMS AND METHODS FOR CHARGING

(75) Inventors: Yaru Najem Mendez Hernandez, Munich (DE); Said Farouk Said El-Barbari, Freising (DE); Parag Vyas, Munich (DE)

(73) Assignee: General Electric Company, Niskayuna, NY (US)

( * ) Notice: Subject to any disclaimer, the term of this patent is extended or adjusted under 35 U.S.C. 154(b) by 714 days.

(21) Appl. No.: 13/172,042

(22) Filed: Jun. 29, 2011

(65) Prior Publication Data

US 2013/0002197 A1     Jan. 3, 2013

(51) Int. Cl.
*H02J 7/04* (2006.01)
*H02J 7/00* (2006.01)
*B60L 11/18* (2006.01)

(52) U.S. Cl.
CPC .......... *B60L 11/1824* (2013.01); *Y02T 10/7088* (2013.01); *Y02T 10/7005* (2013.01); *Y02T 90/16* (2013.01); *Y02T 90/12* (2013.01); *Y02T 90/14* (2013.01)

(58) Field of Classification Search
CPC ............ B60L 11/1824; B60L 11/1811; B60L 11/1809; B60L 11/182; B60L 11/1822; B60L 11/1838
USPC ....................... 320/109, 104, 108; 307/10.1, 9
See application file for complete search history.

(56) References Cited

U.S. PATENT DOCUMENTS

| 5,241,258 | A |   | 8/1993 | Cheon | |
|---|---|---|---|---|---|
| 5,594,318 | A | * | 1/1997 | Nor et al. | 320/108 |
| 5,654,621 | A | * | 8/1997 | Seelig | 320/108 |
| 5,850,135 | A | * | 12/1998 | Kuki et al. | 320/108 |
| 6,239,577 | B1 | * | 5/2001 | Koike et al. | 320/108 |
| 6,388,425 | B1 |   | 5/2002 | Petrovic | |
| 6,664,762 | B2 |   | 12/2003 | Kutkut | |
| 6,803,746 | B2 |   | 10/2004 | Aker et al. | |
| 7,135,836 | B2 |   | 11/2006 | Kutkut et al. | |
| 7,782,015 | B1 | * | 8/2010 | Aaron | 320/123 |
| 8,324,859 | B2 | * | 12/2012 | Rossi | 320/109 |
| 2004/0169489 | A1 | * | 9/2004 | Hobbs | 320/104 |
| 2006/0229040 | A1 | * | 10/2006 | Hofer et al. | 455/196.1 |
| 2010/0133916 | A1 | * | 6/2010 | Sato | 307/104 |
| 2010/0134067 | A1 | * | 6/2010 | Baxter et al. | 320/109 |
| 2011/0156640 | A1 | * | 6/2011 | Moshfeghi | 320/108 |
| 2011/0300813 | A1 | * | 12/2011 | Mirzaei et al. | 455/78 |
| 2012/0280662 | A1 | * | 11/2012 | Krauer | 320/138 |
| 2012/0306439 | A1 | * | 12/2012 | Ichikawa et al. | 320/108 |

* cited by examiner

*Primary Examiner* — Edward Tso
*Assistant Examiner* — Alexis A Boateng
(74) *Attorney, Agent, or Firm* — Robert M. McCarthy (57) ABSTRACT

An electric vehicle charging station is described. The charging station includes an input connector configured for coupling with an alternating current (AC) power source and an output connector configured for coupling with an electric vehicle. The charging station also includes a variable-output transformer comprising a primary side and a secondary side. The primary side is coupled to the input connector and the secondary side is coupled to the output connector and configured to be in selective electromagnetic communication with an energy storage device associated with the electric vehicle. The charging station also includes a controller coupled to the transformer and configured to determine a level of voltage to provide to the electric vehicle.

7 Claims, 4 Drawing Sheets

SYSTEMS AND METHODS FOR CHARGING

BACKGROUND

The embodiments described herein relate generally to electric vehicles and, more specifically, to methods and systems for charging a vehicle that includes an electrochemical energy storage device.

In response to both increasing fuel costs related to the use of conventional combustion engine vehicles and heightened environmental concerns, including air pollution, the use of electric and hybrid vehicles has increased. As a result, energy demand will likely increase in the form of electrical energy used to charge batteries or other energy storage devices used in such vehicles. Electric vehicles, or vehicles that include an electrochemical energy storage device, are defined herein as vehicles that derive some portion of the power used to propel the vehicle from an energy storage device, for example, from batteries. Electric vehicles may include, but are not limited to, vehicles that rely solely on power stored in batteries to drive an electric motor that propels the vehicle (e.g., a traction motor), vehicles that include batteries for storing power used to drive a traction motor and also include an internal combustion engine that drives a generator used to recharge the batteries, and vehicles that include a combination of electric and fossil fuel powered components (e.g., hybrid vehicles). Examples of hybrid vehicles include parallel hybrid vehicles, series hybrid vehicles, and mixed hybrid vehicles. In a parallel hybrid vehicle, an internal combustion engine and an electric machine are mechanically coupled with a traction system. In a series hybrid vehicle, an internal combustion engine and an electric machine are mechanically coupled with a generator and the traction system. Furthermore, a mixed hybrid vehicle is a combination of a parallel and series hybrid vehicle, where the internal combustion engine may be mechanically coupled to the traction system.

Currently, multiple charging levels are available for charging batteries included within an electric vehicle. Examples of different charging levels are described in the Society of Automotive Engineers (SAE) Standard J1772, SAE Electric Vehicle and Plug in Hybrid Electric Vehicle Conductive Charge Coupler. A first and a second charging level may be referred to as slow alternating current (AC) charging. To charge using the first charging level, the electric vehicle is coupled via an AC to AC connector to a vehicle charging station, or to a standard residential electrical outlet, which provides, in the example of the United States of America, 120 volts of alternating current (VAC) at approximately 15-20 amperes. Charging at the first charging level may require 8 to 24 hours to fully charge an electric vehicle. To charge using the second charging level, the electric vehicle is coupled via an AC to AC connector to a vehicle charging station that provides, for example, 240 VAC at approximately 30-32 amperes. The higher power of the second charging level facilitates a quicker charging cycle for the electric vehicle than provided by the standard electrical outlet. For example, charging at the second charging level may require 4 to 10 hours to fully charge the electric vehicle. Typically, the electric vehicle includes an AC to direct current (DC) converter dedicated only to charging. The AC to DC converter provides DC power to the battery for charging.

Additional charging levels may be referred to as "fast charging" levels. Fast charging levels typically apply DC power to the electric vehicle. For example, a fast charging system may apply a DC power directly to a DC bus within the electric vehicle. More specifically, an AC power is received at a vehicle charging station at a high voltage, for example, 480 VAC in the United States of America or 690 VAC in Europe. The vehicle charging station includes an AC to DC converter and the DC power output of the AC to DC converter is provided to the electric vehicle via a DC cable. The DC power provided to the electric vehicle may be in the range of 60 kilowatts (kW) to 150 kW and allow the electric vehicle to reach a 50% charge level in approximately 10-15 minutes.

BRIEF DESCRIPTION

In one aspect, an electric vehicle charging station is provided. The charging station includes an input connector configured for coupling with an AC power source and an output connector configured for coupling with an electric vehicle. The charging station also includes a variable-output transformer comprising a primary side and a secondary side. The primary side is coupled to the input connector and the secondary side is coupled to the output connector and configured to be in selective electromagnetic communication with an energy storage device associated with the electric vehicle. The charging station also includes a controller coupled to the transformer and configured to determine a level of voltage to provide to the electric vehicle.

In another aspect, a method for controlling an electric vehicle charging station for charging an electric vehicle is provided. The method includes receiving AC power at a variable-output transformer and determining a level of voltage to be output from the variable-output transformer for use by the electric vehicle.

In yet another aspect, an apparatus that includes an electric motor and at least one DC energy storage device configured to power the electric motor is provided. The apparatus also includes a power converter comprising a DC connector and an AC connector. The DC connector is coupled to the at least one DC energy storage device. The electric vehicle also includes a connection device coupled to the AC connector for coupling with an AC power source. The electric vehicle also includes a switching device comprising a first position and a second position, wherein the first position couples the AC connector and the electric motor, and the second position couples the AC connector and the connection device.

DETAILED DESCRIPTION

The methods and systems described herein may facilitate rapid charging of a DC energy storage device that may be, for example, included within an electric vehicle. The electric vehicles that can be charged using the methods and systems described herein may include, for example, a traction motor power converter coupled between the DC energy storage device and an electric traction motor. The methods and systems described herein may use the traction motor power converter to also convert AC power provided to the traction motor power converter to DC power for charging the DC energy storage device. Using the traction motor power converter bi-directionally may eliminate the need for a separate power converter used only during charging of the DC energy storage device. Eliminating the separate battery charging power converter in the electric vehicle can reduce an overall weight of the electric vehicle, which may increase an efficiency of the electric vehicle. Eliminating a separate AC to DC converter included within a DC electric vehicle charging station may also reduce the cost and complexity of the charging station. Furthermore, the traction motor power converter included within the electric vehicle can be rated to handle high voltages, which when applied for charging the DC energy storage device, may reduce a time required to charge the DC energy storage device and extend the usage of the traction motor power converter.

Technical effects of the methods, systems, and computer-readable media described herein include at least one of: (a) receiving AC power from an AC power source; (b) determining a level of voltage to provide to the electric vehicle; and (c) providing AC power to the power converter at the determined level of voltage.

Figure 1:
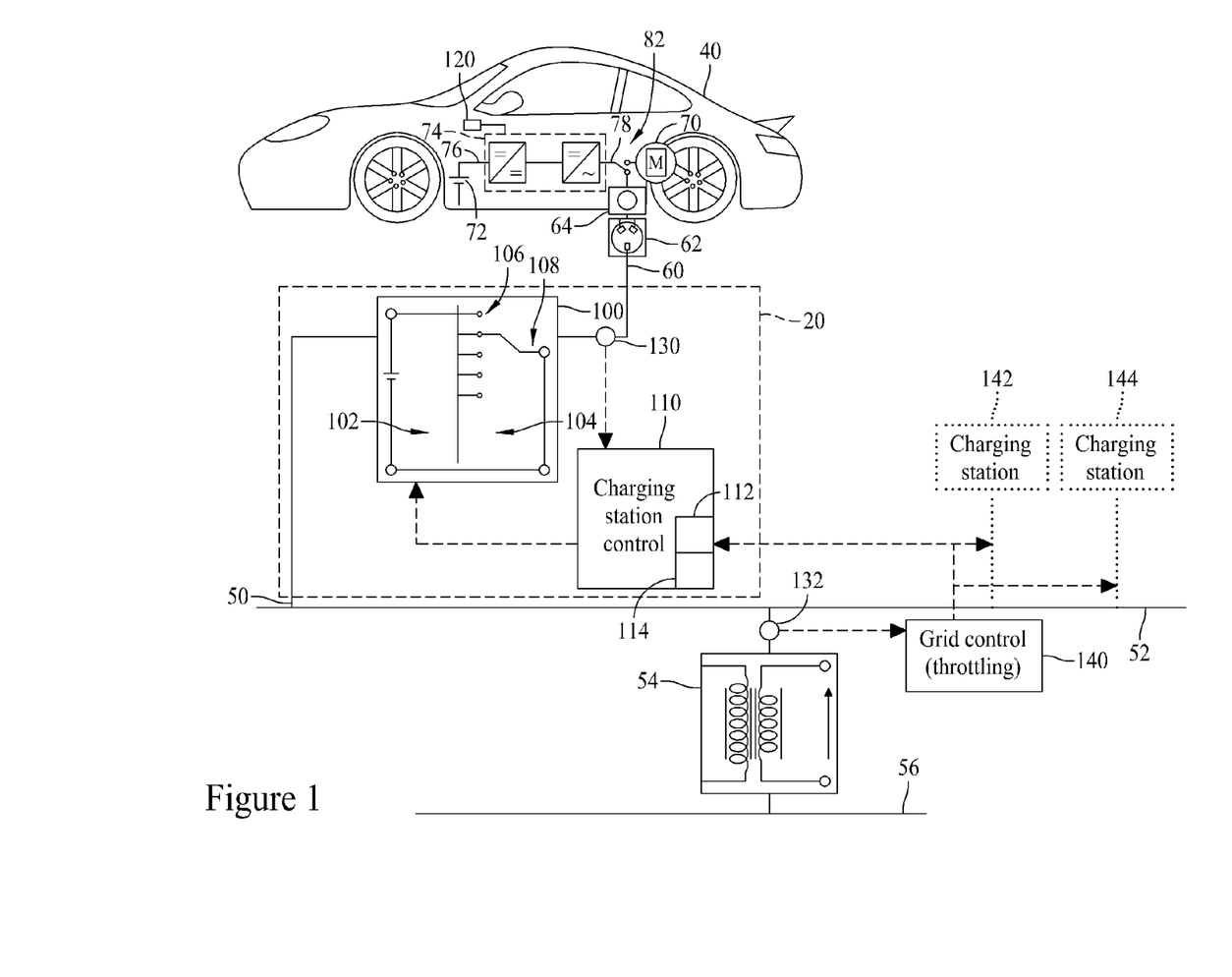
FIG. 1 is a schematic diagram of an example electric vehicle charging system.

FIG. 1 is a schematic diagram of an example electric vehicle charging station 20 and an electric vehicle 40 configured for charging using electric vehicle charging station 20. In the example embodiment, electric vehicle charging station 20 is referred to as a "fast charging" alternating current (AC) electric vehicle charging system. Charging station 20 can be configured to provide AC power to electric vehicle 40, for example, but not limited to, ranging from 50 kilowatts (kW) to 100 kW.

In the example embodiment, electric vehicle charging station 20 includes at least one input connector 50 for coupling with an AC power source 52. For example, AC power source 52 may include, but is not limited to, an AC grid. Input connector 50 may include a plurality of terminals configured to place charging station 20 in electrical communication with AC power source 52, components that facilitate inductive coupling of charging station 20 and AC power source 52, and/or any other type of connector that places charging station 20 in electromagnetic communication with AC power source 52. AC grids are maintained at different voltage levels dependent upon a location within the distribution/transmission process. In the example embodiment, AC power source 52 provides charging station 20 with 480 volt 3-phase AC power, which is a typical voltage level available on a power grid located in the United States of America. Alternatively, AC power source 52 may provide charging station 20 with 690 volt 3-phase AC power, which is a typical voltage level available on a power grid located in, for example, European countries. In the example embodiment, power source 52 receives power from a transformer 54 that reduces a voltage level from a distribution grid 56 from 33 kV to 480 volts or 690 volts. Although described as either receiving 480 volt or 690 volt AC power, charging station 20 may receive power having any suitable voltage level that allows the charging station 20 to function as described herein.

In the example embodiment, electric vehicle charging station 20 also includes a plurality of conductors, for example, positioned within an AC cable 60. In the example embodiment, AC cable 60 includes an output connector 62 and electric vehicle 40 includes a corresponding input connector, included within, for example, a connection device 64, for coupling charging station 20 to electric vehicle 40. In an alternative embodiment, AC cable 60 is provided by a user, in which case, electric vehicle charging station 20 includes output connector 62 which is configured for coupling with AC cable 60. Output connector 62 may include a plurality of terminals configured to place charging station 20 in electrical communication with electric vehicle 40, components that facilitate inductive coupling of charging station 20 and electric vehicle 40, and/or any other type of connector that selectively places charging station 20 in electromagnetic communication with electric vehicle 40.

In the example embodiment, electric vehicle 40 includes an electric motor 70 and at least one energy storage device, for example, but not limited to, a battery 72 configured to power electric motor 70. Electric motor 70 is coupled to a traction system (not shown in FIG. 1) of electric vehicle 40 and may also be referred to as a traction motor. Battery 72, as referred to herein, may include a single electrochemical cell, a plurality of electrochemical cells coupled to form a battery array, or any other suitable configuration of chemical energy storage devices. In the example embodiment, a power converter 74 couples battery 72 and electric motor 70. More specifically, converter 74 includes a DC connector 76 coupled to battery 72 and an AC connector 78 coupled to electric motor 70. In the example embodiment, power converter 74 is a bi-directional converter configured to convert a DC power from battery 72 to AC power for powering electric motor 70. Furthermore, power converter 74 is also configured to convert AC power provided by electric vehicle charging station 20 to a DC power for charging battery 72.

In the example embodiment, electric vehicle 40 also includes a switching device 82. In a first position, switching device 82 couples AC connector 78 to electric motor 70. In a second position, switching device 82 couples AC connector 78 to connection device 64, and uncouples AC connector 78 from electric motor 70. Switching device 82 may be operated based on a manual signal provided by a user or an automatically generated signal, for example, but not limited to, a signal generated when electric vehicle 40 is coupled to charging station 20. Switching device 82 may include, but is not limited to, solid state and/or electromechanically actuated components.

In the example embodiment, charging station 20 includes a variable-output transformer 100. In an alternative embodiment, variable-output transformer 100 is included within an electric substation, for example, transformer 54 (shown in FIG. 1) may be a variable-output or multiple tap transformer. The variable-output transformer 100 includes a primary side 102 and a secondary side 104. Primary side 102 is coupled to input terminal 50 and secondary side 104 is coupled to AC cable 60. Variable-output transformer 100 may include an autotransformer and/or a transformer with multiple tap windings. The output of variable-output transformer 100 is a fixed frequency, variable output power. In other words, the voltage output of variable-output transformer 100 is adjustable. For example, variable-output transformer 100 may include a plurality of taps 106. Each tap of the plurality of taps 106 corresponds to a different output voltage. AC cable 60 is coupled to the tap that correspond to the desired output voltage. In the example embodiment, transformer 100 includes a power electronics based tap changer 108 that changes the tap coupled to AC cable 60. The power electronics based tap changer 108 may include, but is not limited to, electromechanical and/or semiconductor based electronics.

In the example embodiment, electric vehicle charging station 20 receives a high voltage from AC power source 52. For example, electric vehicle charging station 20 may be coupled to a 480 volt power grid, for example, as is available in the United States of America, or a 690 volt power grid, for example, as is available in many European countries. The high distribution voltage allows for a reduction of current at a given power level, which facilitates minimizing a cost of cables used to distribute the power. Furthermore, since variable-output transformer 100 is able to reduce the AC voltage level, the AC voltage level can be adapted to the charging technology of electric vehicle 40 and/or the energy storage device included within electric vehicle 40, and charging station 20 may be directly coupled to electric vehicle 40.

In the example embodiment, electric vehicle charging station 20 also includes a charging station controller 110 coupled to transformer 100. In the exemplary embodiment, charging station controller 110 includes a processor 112 and a memory device 114. The term processor, as used herein, refers to central processing units, microprocessors, microcontrollers, reduced instruction set circuits (RISC), application specific integrated circuits (ASIC), logic circuits, and any other circuit or processor capable of executing the functions described herein. The level of voltage provided by electric vehicle charging station 20 may be higher than electric vehicle 40 can use for charging. Controller 110 is configured to determine a level of voltage to provide to electric vehicle 40. The level of voltage that will most rapidly charge a battery included in an electric vehicle varies from vehicle to vehicle. The level of voltage that will most rapidly charge the battery may vary dependent upon the motor technology, design, battery voltage, and semiconductor devices included within the electric vehicle. For example, the level of voltage that will most rapidly charge the battery is dependent upon the battery DC voltage. Matching the AC feeding voltage to the battery DC voltage minimizes switching losses of power converter 74. Furthermore, controller 110 is configured to selectively couple the plurality of taps 106 within transformer 100 to provide the determined level of voltage to electric vehicle 40.

Electric vehicle 40 also includes a system controller 120 coupled to, and configured to control operation of, power converter 74. System controller 120 also transmits a voltage level signal to connection device 64 and AC charging station 20. The voltage level signal corresponds to a maximum voltage level at which to charge battery 72. System controller 120 transmits the voltage level signal to charging station 20, which uses the voltage level signal as a maximum voltage level charging station 20 will provide electric vehicle 40 to charge battery 72. For example, system controller 86 may modulate the switching frequency of power converter 74 to encode the voltage level signal for transmission to charging station 20. Power converter 74 provides a pulse width modulated (PWM) signal to charging station 20 that includes information about the charging voltage that, when applied to power converter 74, will most rapidly charge battery 72. Switching device 82 disconnects electric motor 70 from converter 74 when AC power is applied to connection device 64.

In the example embodiment, controller 110 may determine the level of voltage to provide electric vehicle 40 based on the voltage level signal received from electric vehicle 40. The voltage level signal received from electric vehicle 40 includes a maximum voltage level with which to charge battery 72. In the example embodiment, controller 110 detects and demodulates the switching frequency of power converter 74 to determine the level of voltage to provide to electric vehicle 40. For example, power converter 74 may generate a PWM signal having a fixed duty cycle. When the PWM signal is filtered, a DC value corresponds to a battery voltage per unit. Alternatively, "one other way of determining the battery voltage is to apply a certain switching vector the power bridge; e.g., in a 2 level 3 phase inverter for the upper IGBT (on off off) and (off on on) for the lower IGBTs.

Alternatively, system controller 120 may also transmit the voltage level signal to connection device 64 and AC charging station 20 using other communication protocols including, but not limited to, a dedicated communications channel, power line communications, and/or any other type of signal transmission that allows charging station 20 to function as described herein. However, including the voltage level signal within a modulated switching frequency, or transmitting the voltage level signal using power line communications, facilitates transmission of information between electric vehicle 40 and charging station 20 without use of a separate data communication conductor. This reduces a number of conductors, as well as a cost of the cable, used to couple vehicle 40 to charging station 20. Standard electrical power connectors (i.e., sockets and plugs) are widely available. However, specially combined power and data cables are not as widely available, and therefore their use may limit the widespread adoption of electric vehicles.

In another alternative embodiment, a voltage level of the power output of transformer 100 is iteratively increased, for example, beginning at zero volts, until reaching a maximum voltage level. At least one sensor 130 is configured to measure at least one of a voltage and a current output by transformer 100. For example, charging station controller 110 may monitor a current level drawn by electric vehicle 40. More specifically, in a first embodiment, charging station controller 110 provides AC power to electric vehicle 40 at a first voltage level, measures the power output of the variable-output transformer 100, and increases the voltage level of the AC power provided to electric vehicle 40 until the power output of transformer 100 is limited by electric vehicle 40. As the voltage is increased, electric vehicle 40 draws an increasing level of current. However, electric vehicle 40 limits the level of current it draws. Once the current is limited by electric vehicle 40, even if charging station 20 continues to increase the output voltage, the power output of charging station 20 will increase by less than if the voltage and current were increasing. Charging station controller 110 senses this reduction in the rate of power increase and the voltage level of the output power is set at charging station 20. In a second embodiment, a maximum current level is stored in charging station memory device 114. The voltage of the power output by charging station 20 is increased from, for example zero volts, to X volts, where X volts is the voltage level when the current drawn by electric vehicle 40 is at the maximum current level. More specifically, controller 110 is configured to provide AC power to electric vehicle 40 at a first voltage level, measure a level of current drawn by electric vehicle 40, and increase the voltage level of the AC power provided to electric vehicle 40 until the level of current drawn by electric vehicle 40 equals the maximum current level.

Power converter 74 is configured to withstand a high rate of change of voltage at a specific point in time (i.e., a high dV/dt). For example, insulation may be included within power converter 74 to prevent damage to power converter 74 caused by the high dV/dt. Furthermore, to prevent a harmonic content generated by power converter 74 from being applied to power grid 52, transformer 100 is configured to include a high inductance, which limits high frequency and eventually short-circuit current components from being applied to power grid 52. In an alternative embodiment, an active or passive filter (not shown in FIG. 1) may be positioned, for example, within charging station 20, at a point of interconnection between charging station 20 and power grid 52, and/or at any other position that facilitates preventing harmonic content generated by power converter 74 from being applied to power grid 52.

In the example embodiment, controller 110 may regulate a power output of electric vehicle charging station 20. For example, controller 110 may regulate the power output of charging station 20 so as not to exceed a predefined power level. Controller 110 monitors a power level available for use by charging station 20 and limits the power output of charging station 20 to not exceed the predefined power level. At least one sensor 132 is configured to measure at least one of a voltage and a current output by transformer 54 and provided to power grid 52. The predefined power level is dependent on the power available from AC power source 52 and power reserved for use by non-vehicle charging loads. For example, in a situation where charging station 20 is provided by a merchant for use by customers of the merchant, loads associated with the merchant's facility (e.g., a store) may also be coupled to, and receive power from, power grid 52. Such loads are referred to herein as non-vehicle charging loads. A power required for non-vehicle charging loads is stored, for example, in memory device 114.

In the example embodiment, controller 110 receives at least one of a voltage level signal and a current level signal from sensor 132 corresponding to at least one of a voltage level and a current level of power provided by AC power source 52 to input terminals 50. Controller 110 determines the available power level based on the voltage level signal and current level signal from sensor 132. Controller 110 also determines the predefined power level by comparing the available power to the power level reserved for use by non-vehicle charging loads. Furthermore, controller 110 limits the power output of electric vehicle charging station 20 to the difference between the available power level and the predefined power level. Limiting the power output of electric vehicle charging station 20 is achieved by limiting the output voltage of charging station 20, for example, by controlling variable-output transformer 100 to limit the output voltage. In many situations, even if the output voltage of charging station 20 is limited, the power provided to electric vehicle 40 will remain higher than, for example, a power level associated with slow AC charging.

In an alternative embodiment, a central controller 140 regulates the power output of electric vehicle charging station 20, and also regulates the power output of additional charging stations coupled to power grid 52, for example, electric vehicle charging stations 142 and 144. In the alternative embodiment, central controller 140 limits the total power output of charging stations 20, 142, and 144 such that power output by charging stations 20, 142, and 144 does not exceed the predefined power level.

Furthermore, electric vehicle charging station 20, and more specifically, controller 110, may be configured to facilitate drawing energy from battery 72 and applying the energy to power grid 52. The energy drawn from battery 72 may be useful for grid control, including, but not limited to, maintaining grid stability. For example, if there is a contingency in power grid 52, controller 110 may draw energy from battery 72 and apply it to power grid 52 to maintain operation of power grid 52 within values required by the grid operator and thus avoid load shedding or sharing.

Figure 2:
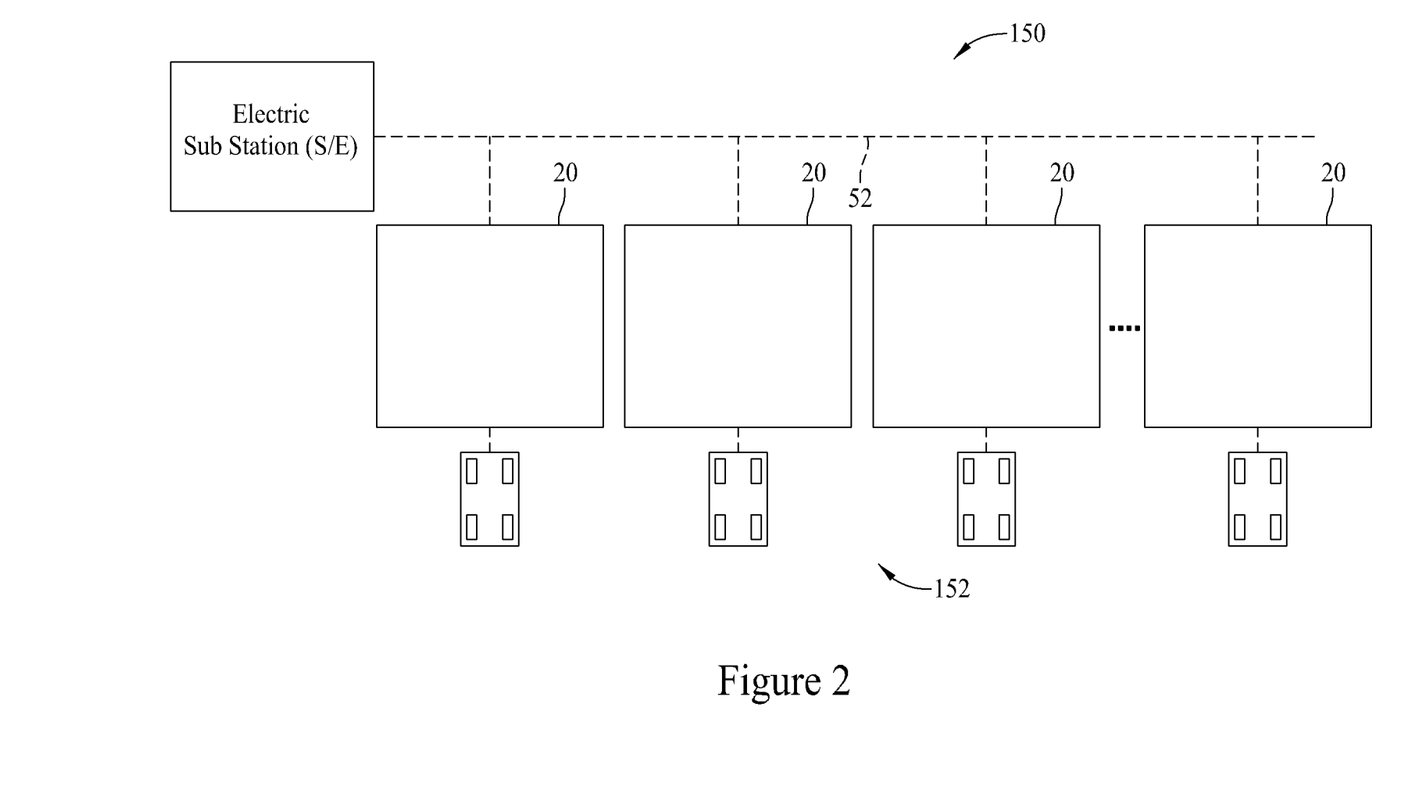
FIG. 2 is a block diagram of an example electric vehicle charging system for charging a plurality of electric vehicles.

FIG. 2 is a block diagram of an example electric vehicle charging system 150 for charging a plurality of electric vehicles 152. Electric vehicle charging station 20, as described above with respect to a single electric vehicle, is also applicable to charging of multiple vehicles. In the example embodiment, electric vehicle charging system 150 includes a plurality of electric vehicle charging stations 20, each coupled to AC power source 52. Electric vehicle charging system 150 may be positioned at, for example only, a parking lot and/or parking structure. For example, electric vehicle charging stations may be made available to customers of a merchant that provides access to the parking lot and/or structure so that the customers are able to charge their electric vehicles while patronizing the merchant's facility. In another example, electric vehicle charging stations may be made available by an employer to allow employees to charge their electric vehicles while they are working. As described above, charging station controller 110 (shown in FIG. 1) and/or central controller 140 (shown in FIG. 1) regulates the power output of charging stations 20 so as not to exceed a predefined power level. Regulating the power output of charging stations 20 ensures that power for non-vehicle charging loads is not negatively affected by operation of charging stations 20.

Figure 3:
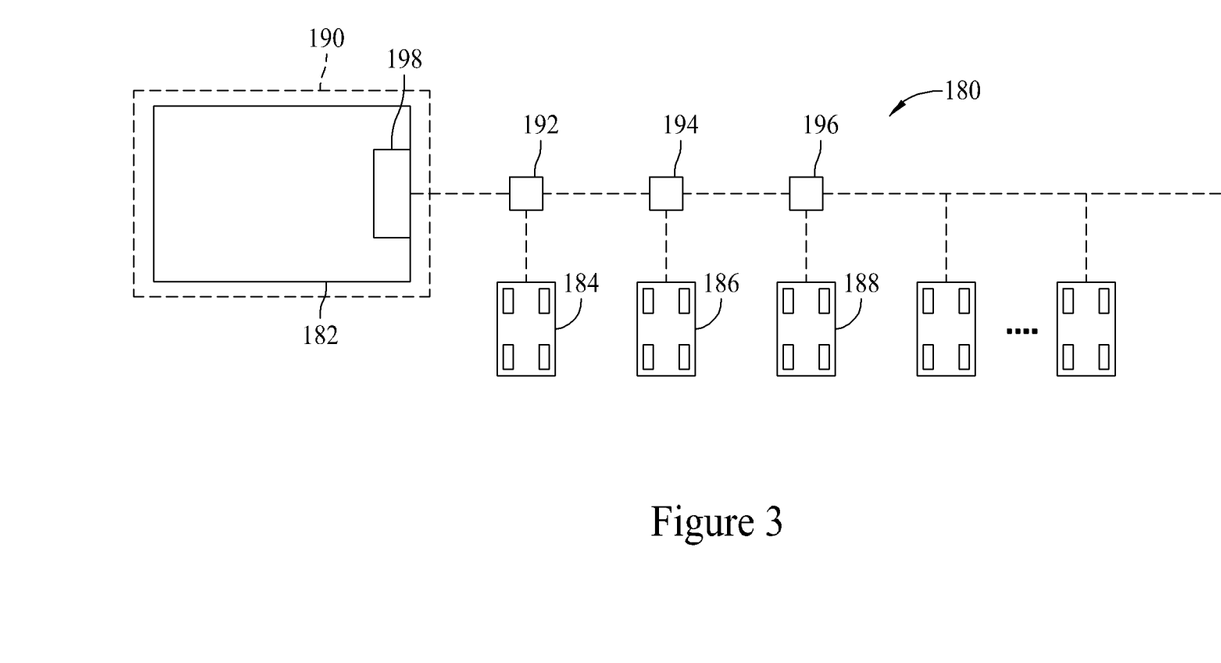
FIG. 3 is a block diagram of an alternative embodiment of the electric vehicle charging system shown in FIG. 2.

FIG. 3 is a block diagram of an alternative embodiment 180 of electric vehicle charging system 150. In the alternative embodiment, electric vehicle charging system 180 includes a central electric vehicle charging station 182 that is configured to charge multiple electric vehicles, for example, a first electric vehicle 184, a second electric vehicle 186, and/or a third electric vehicle 188. Electric vehicle charging station 182 may be positioned at or within an electric substation 190. Electric vehicle charging system 180 includes multiple connection stations, for example, a first connection station 192, a second connection station 194, and a third connection station 196, through which electric vehicles 184, 186, and 188 may be coupled to electric vehicle charging station 182. Electric vehicle charging station 182 may include multiple variable-output transformers, for example, one variable-output transformer for each of the connection stations 192, 194, and 196. Electric vehicle charging station 182 determines the maximum voltage level of each of the electric vehicles coupled to charging station 182 and provides power to each respective electric vehicle at the maximum voltage level.

Alternatively, electric vehicle charging station 182 may include a single variable-output transformer and at least one switching device 198. Switching device 198 controls which of connection stations 192, 194, and 196 receives power. For example, it may be determined that electric vehicle 186 is to be provided with power first, electric vehicle 184 second, and electric vehicle 188 third. Electric vehicle charging station 182 first determines the maximum voltage level to provide electric vehicle 186 and provides power to second connection station 194 accordingly. Once charging of electric vehicle 186 is complete, or upon completion of a predetermined time limit, switching device 198 disconnects second connection station 194 from electric vehicle charging station 182. Electric vehicle charging station 182 determines the maximum voltage level to provide electric vehicle 184 and provides power to first connection station 192 accordingly. Although switching device 198 is described as included within electric vehicle charging station 182, electric vehicle charging system 180 may include multiple switching devices positioned, for example, at connection stations 192, 194, and 196, and controlled to supply power to a selected connection station 192, 194, and 196. Furthermore, a switching device may be positioned at any suitable position within electric vehicle charging system 180 that allows system 180 to function as described herein.

Figure 4:
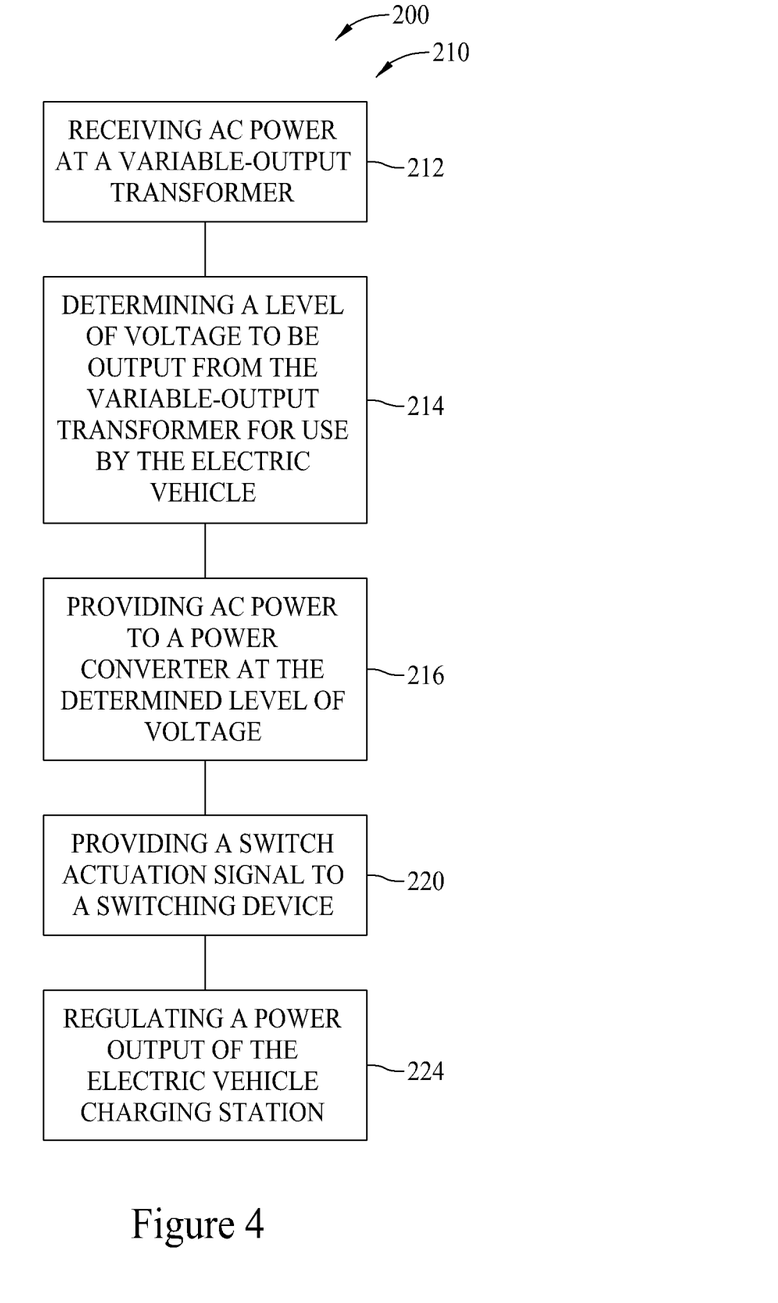
FIG. 4 is a flow chart of an example method for controlling the electric vehicle charging stations shown in FIGS. 1-3.

FIG. 4 is a flow chart 200 of an example method 210 for controlling an electric vehicle charging station, for example, electric vehicle charging station 20 (shown in FIG. 1). As described above, electric vehicle charging station 20 is configured for charging an electric vehicle, for example, electric vehicle 40 (shown in FIG. 1). In an example embodiment, method 210 is a computer-implemented method, for example, a computer-implemented method executed by charging station controller 110 (shown in FIG. 1). In another example embodiment, a computer program embodied on a computer readable medium includes at least one code segment, that when executed by a computer, for example, charging station controller 110, performs method 210. Aspects of the invention transform a general-purpose computer into a special-purpose computing device when configured to execute the instructions described herein.

In the example embodiment, method 210 includes receiving 212 AC power at a variable-output transformer, for example, transformer 100 (shown in FIG. 1), from an AC power source, for example, power source 52 (shown in FIG. 1). Method 210 may also include determining 214 a level of voltage to be output from transformer 100 for use by electric vehicle 40. For example, controller 110 may determine 214 the level of voltage based at least in part on a voltage level signal received from electric vehicle 40. Controller 110 may detect a modulated switching frequency of power converter 74 and demodulate the switching frequency to determine 214 the level of voltage to provide to electric vehicle 40. Furthermore, controller 110 may receive the voltage level signal from electric vehicle 40 using a communications channel, power line communications, and/or any other type of signal transmission that allows charging station 20 to function as described herein. Method 210 also includes providing 216 AC power to power converter 74 at the determined level of voltage.

In the example embodiment, method 210 also includes providing 220 a switch actuation signal to a switching device, for example, switching device 82 (shown in FIG. 1) positioned between power converter 74 and electric motor 70. Upon receipt of the switch actuation signal, switching device 82 uncouples electric motor 70 from power converter 74 and couples power converter 74 to electric vehicle charging station 20.

In the example embodiment, method 210 may also include regulating 224 a power output of electric vehicle charging station 20. For example, controller 110 may regulate 224 the power output of charging station 20 so as not to exceed a predefined power level or a predefined voltage level. In the example embodiment, the predefined power level is dependent upon the power available from AC power source 52 and an amount of power reserved for use by non-electric vehicle charging loads. More specifically, a level of power needed for all loads other than electric vehicle charging loads may be stored in, for example, memory device 114 (shown in FIG. 1). Regulating 224 the power output of charging station 20 may include receiving at least one of a voltage level signal and a current level signal from at least one sensor, for example, sensor 132, configured to measure an output power of AC power source 52. Regulating 224 the power output may also include determining a level of power available from AC power source 52 and comparing the available power level to the power level predefined as needed for non-electric vehicle charging applications. Regulating 224 may also include determining the power output of electric vehicle charging station 20 (e.g., determining the charging voltage to provide) based on the difference between the available power level and the predefined power level. This may also be referred to as throttling of the charging voltage provided by charging station 20 to the electric vehicles. Controller 110, or a separate, central controller, for example, central controller 140, may be configured to regulate the power provided to a plurality of electric vehicles, for example, plurality of electric vehicles 152 (shown in FIGS. 2 and 3) so that the predefined level of power is available to non-electric vehicle charging loads.

It should be noted that embodiments presented herein are not limited to any particular processor for performing the described processing tasks. The term "processor," as that term is used herein, is intended to denote any machine capable of performing the calculations, or computations, necessary to perform the tasks of the invention. The term "processor" also is intended to denote any machine that is capable of accepting a structured input and of processing the input in accordance with prescribed rules to produce an output. It should also be noted that the phrase "configured to" as used herein means that the processor is equipped with a combination of hardware and software for performing the tasks of embodiments presented herein, as will be understood by those skilled in the art.

Embodiments presented herein embrace one or more computer readable media, wherein each medium may be configured to include or includes thereon data or computer executable instructions for manipulating data. The computer executable instructions include data structures, objects, programs, routines, algorithms, or other program modules that may be accessed by a processing system, such as one associated with a general-purpose computer capable of performing various different functions or one associated with a special-purpose computer capable of performing a limited number of functions. Computer executable instructions cause the processing system to perform a particular function or group of functions and are examples of program code means for implementing steps for methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system.

Described herein are example methods and systems for charging an electric vehicle. More specifically, the methods and systems described herein may facilitate fast AC charging of an electric vehicle that utilizes the traction motor power converter included within the electric vehicle. The methods and systems described herein may determine a maximum voltage level of power to provide to the electric vehicle and include an adjustable transformer to provide voltage at the determined level. Furthermore, the adjustable transformer may facilitate regulating a power output of the electric vehicle charging station(s) such that a power level predefined as needed for non-vehicle charging loads remains available to those loads.

The methods and systems described herein can facilitate efficient and economical charging of electric vehicles. Example embodiments of methods and systems are described and/or illustrated herein in detail. The methods and systems are not limited to the specific embodiments described herein, but rather, components of each system, as well as steps of each method, may be utilized independently and separately from other components and steps described herein. Each component, and each method step, can also be used in combination with other components and/or method steps.

When introducing elements/components/etc. of the methods and apparatus described and/or illustrated herein, the articles "a", "an", "the", and "said" are intended to mean that there are one or more of the element(s)/component(s)/etc. The terms "comprising", "including", and "having" are intended to be inclusive and mean that there may be additional element(s)/component(s)/etc. other than the listed element(s)/component(s)/etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An apparatus comprising:
    an input connector configured for coupling with an alternating current (AC) power source;
    an output connector configured for coupling with an electric vehicle;
    a variable-output transformer comprising a primary side and a secondary side, wherein said primary side is coupled to said input connector and said secondary side is coupled to said output connector and configured to be in selective electromagnetic communication with an energy storage device associated with the electric vehicle; and
    a controller coupled to said transformer and configured to determine a level of voltage to provide to the electric vehicle, wherein said controller is configured to receive a voltage level signal from the electric vehicle corresponding to a maximum voltage level, and wherein the electric vehicle comprises a switching device positioned between a power converter and an electric motor within the electric vehicle, wherein the switching device selectively couples the power converter to the variable-output transformer or the electric motor upon actuation of the switching device.

2. An apparatus in accordance with claim 1, wherein said variable-output transformer further comprises a plurality of taps, and wherein said output connector is selectively coupled by at least one of a solid state and an electromechanical device to said plurality of taps to provide the determined level of voltage to the electric vehicle.

3. An apparatus in accordance with claim 1, wherein said controller is configured to:
    receive a switching frequency modulated to transmit said voltage level signal; and
    demodulate the modulated switching frequency to determine the level of voltage to provide to the electric vehicle.

4. An apparatus in accordance with claim 1, wherein said controller is further configured to:
    provide AC power to the electric vehicle at a first voltage level;
    measure the power output of said transformer; and
    increase the voltage level of the AC power provided to the electric vehicle until the power output of said transformer is limited by the electric vehicle.

5. An apparatus in accordance with claim 1, wherein said controller comprises a memory device configured to store a maximum current level, and wherein said controller is configured to:
    provide AC power to the electric vehicle at a first voltage level;
    measure a level of current drawn by the electric vehicle; and
    increase the voltage level of the AC power provided to the electric vehicle until the level of current drawn by the electric vehicle equals the maximum current level.

6. An apparatus in accordance with claim 1, wherein said controller is configured to:
    receive at least one of a voltage level signal and a current level signal corresponding to at least one of a voltage level and a current level of power provided by the AC power source to said input connector;
    determine an available power based on the at least one of a voltage level signal and a current level signal;
    compare the available power to a power level predefined as needed for non-vehicle charging loads also receiving power from the AC power source; and
    limit the power output of said variable-output transformer to the difference between the available power level and the predefined power level.

7. An apparatus in accordance with claim 1, wherein said output connector is configured for coupling with an electric vehicle converter, wherein the electric vehicle converter is a bi-directional converter configured to convert a DC power from said energy storage device to AC power for powering an electric vehicle traction motor and to convert the AC power from said variable-output transformer to a DC power for charging said energy storage device.

* * * * *